April 14, 1936.    K. T. POTTHOFF    2,037,264
APPARATUS FOR TREATING MATERIAL
Filed May 11, 1927    3 Sheets-Sheet 2
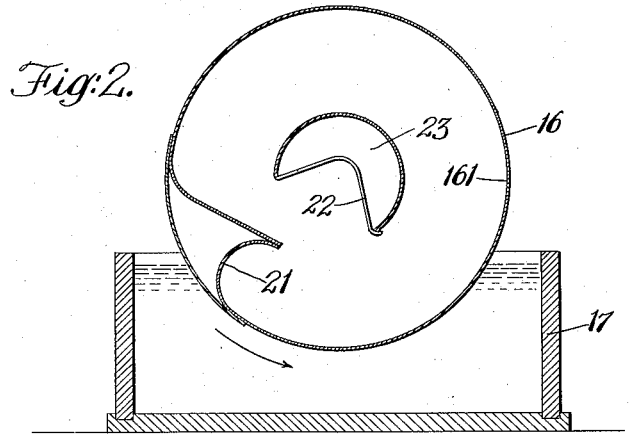
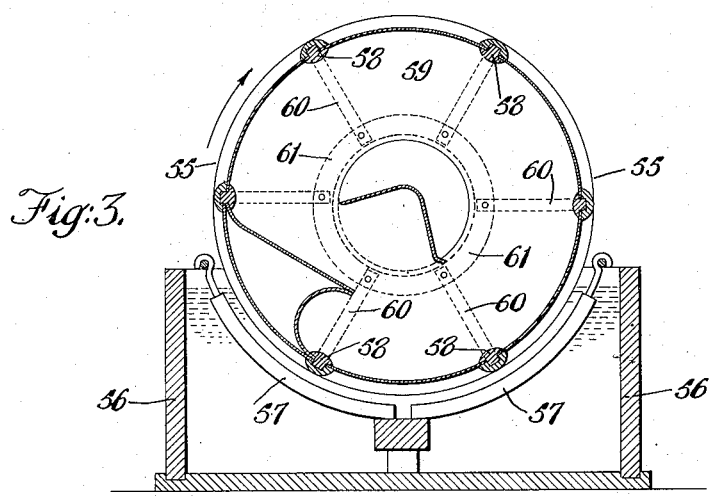
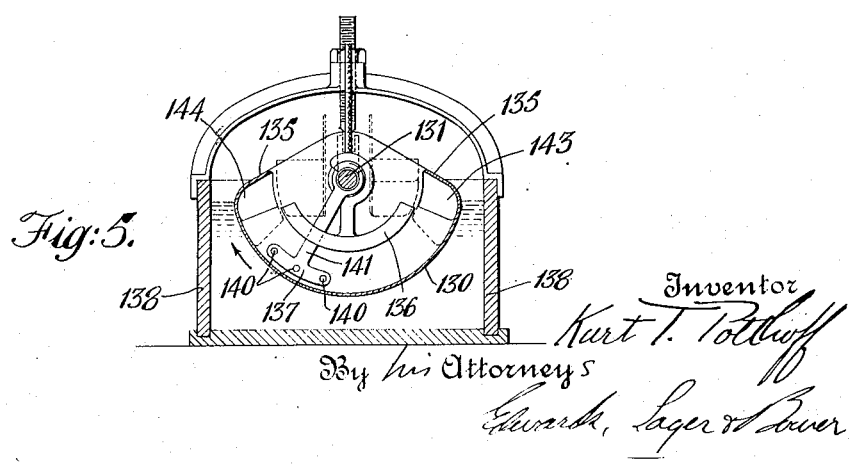

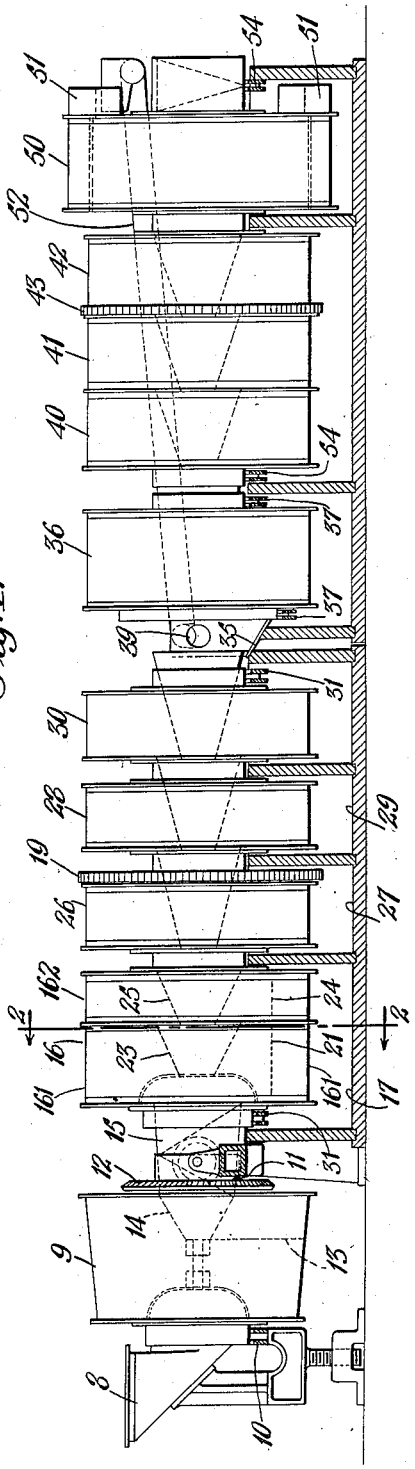

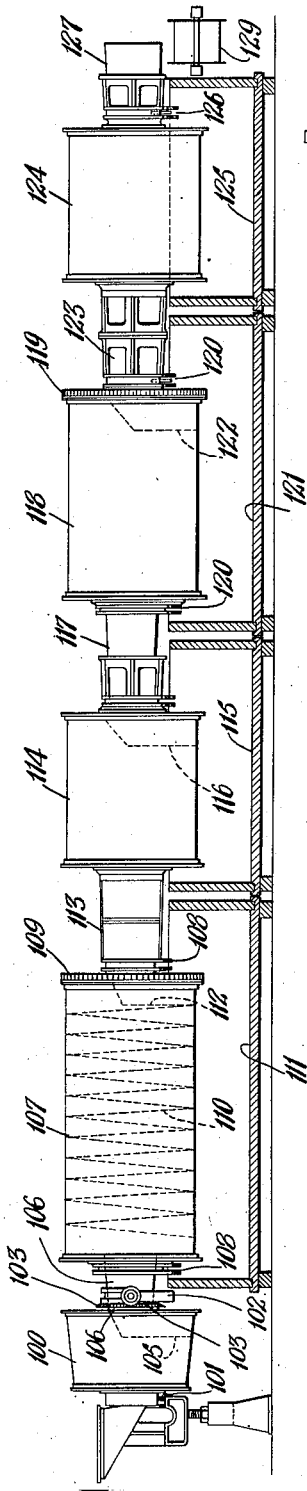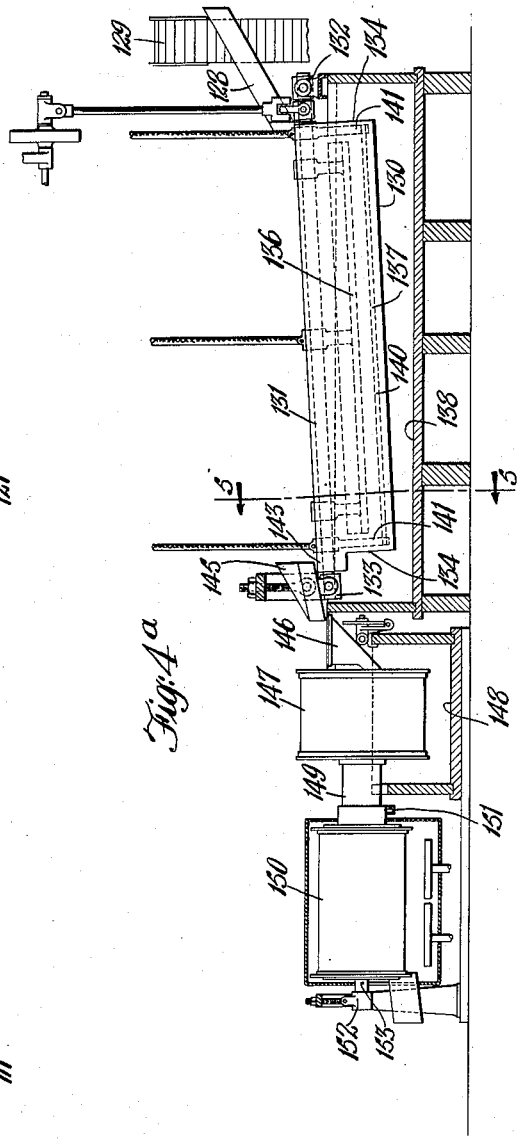

Patented Apr. 14, 1936

2,037,264

UNITED STATES PATENT OFFICE 2,037,264

APPARATUS FOR TREATING MATERIAL

Kurt T. Potthoff, Brooklyn, N. Y., assignor to U. S. Galvanizing & Plating Equipment Corporation, a corporation of West Virginia Application May 11, 1927, Serial No. 190,446

9 Claims. (Cl. 204—5)

This invention relates to apparatus for the treatment of material in bulk and particularly to cleaning, plating, coating or any similar operation on quantities of small articles. The object of the invention is to provide apparatus which will receive the articles in bulk and automatically and continuously carry them through a series of related operations and properly time the successive steps and deliver the articles in finished form without the intervention of hand operation at any stage.

Further objects of the invention particularly in making the apparatus adaptable for a variety of operations will appear from the following description taken in connection with the accompanying drawings, in which Figs. 1 and 1a are side elevational views of one embodiment of the invention with parts in section, Fig. 2 is a sectional view on line 2—2 of Fig. 1, Fig. 3 is a sectional view on line 3—3 of Fig. 1a, Figs. 4 and 4a are side elevational views of a modification, and Fig. 5 is a section on line 5—5 of Fig. 4a.

In the embodiment of the invention shown in Figs. 1 to 3 the material is fed through chute 8 into feeding drum 9 rotatably mounted in cradles 10 and 11 the former of which is vertically adjustable to raise and lower the entrance end of the feeding drum so as to adjustably incline its axis. The drum 9 is driven from a source of power (not shown) by bevel gears 12 and its rate of rotation is such that at desired intervals, for instance one and one half minutes, its scoop blade 13 picks up a charge of material and passes it into the transfer chambers 14 and 15 which carry it into the next drum 16. The amount of material or number of articles picked up by the scoop blade 13 is adjusted by the inclination of the axis of the feed drum.

The drum 16 is mounted so that its lower portion is immersed in a liquid in tank 17 and as the peripheral material of the drum is perforated or porous the material in the drum is submerged in the tank liquid and tumbled and stirred therein by the rotation of the drum. The liquid in the tank 17 may be, for instance, an alkaline solution for removing dirt and grease from the material and articles, and the most desirable time of exposure to this alkaline solution may be about three minutes. The drum 16 and the next succeeding three drums are all connected together to be rotated by the gear drive 19 and as these succeeding drums involve operations requiring less time, about one and one-half minutes each, drum 16 is divided into two parts 161 and 162. The material fed to part 161 remains therein about one and a half minutes when it is raised up by scoop pocket 21 (see Fig. 2) and dropped into the segmental opening 22 of conical chamber 23 from which it slides into part 162 of the drum where it remains another one and one-half minutes before it is picked up by scoop pocket 24. The total time of exposure in the alkaline solution of tank 17 is therefore three minutes.

The scoop pocket 24 drops the material into the transfer chamber 25 which passes it on to the next drum 26 rotating in tank 27 containing cleaning water so that the articles are washed in this water about one and one half minutes before they are picked up and passed on to the drum 28 by a scoop pocket and transfer chamber similar to those of the previous drum. The tank 29 of drum 28 contains an acid solution to neutralize any alkali remaining on the articles and pickle for removing oxide or scale and the charge of material is kept in this acid solution about one and one half minutes and then passed on to the water wash in drum 30 wherein it remains a similar length of time. Drums 16, 26, 28 and 30 are connected together as a unit rotatable in cradles 31 and driven by gear 19.

A charge of material delivered from drum 30 passes through the stationary chamber 35 into the storage drum 36 mounted in cradles 37 and oscillated through a 180° turn and back every six minutes. Each oscillation scoops up and empties the charges of material from this storage drum into the first ball burnishing drum 40, the balls for this burnishing having been supplied to the material through the opening 39 in this stationary transfer chamber 35. There are three ball burnishing drums 40, 41 and 42 connected together as a unit and driven by gear 43 rotating for six minutes so that the material mixed with the burnishing balls is tumbled for six minutes in each drum making eighteen minutes of ball burnishing all together. Four charges of material from the drum 30 accumulate in the storage drum 36 and are passed by this drum 36 to and through the ball burnishing drums as a single charge which is finally passed into the washing and screening drum 50 wherein the material is washed and the balls are screened out and carried up by buckets 51 and passed back through chute 52 to the opening 39 in transfer chamber 35. The drum 50 is connected to be rotated with the drums 40, 41 and 42 in cradles 54, and the buckets 51 when rotated to upper positions will dump their contents into the end portion of the chute 52 which they will then overlie.

The material leaving the drum 50 has been cleaned, polished and washed and is now ready for plating in the drum 55 of plating tank 56. The plating tank 56 contains a plating solution and is provided with renewable anodes 57 while the drum 55 carries the cathode bars 58 extending between the heads 59 and connected by strips 60 to distributing rings 61 receiving the current from flange rings 62 supported on the current supplying rollers of the cradles 63. The material from the washing drum 50 is fed to the plating drum 55 in charges or batches every six minutes. The material for which the apparatus is specifically designed may require for instance twenty-four minutes of exposure to the plating deposit and plating drum 55 rotating once in about six minutes is divided into four separate sections 64, 65, 66 and 67 the material remaining about twenty-four minutes all together in the plating tank 56.

The material is then passed on to the wash drum 68 in wash tank 69 wherein it remains for six minutes, the wash drum 68 being connected to the plating dum 55 as a unit driven by gear 70 and rotating in cradles 63 and 63'.

The material from the wash drum 68 is discharged into the stationary chute 71 where it is mixed with burnishing balls from the return ball chute 72, the mixed material passing into the final burnishing drum 73 completing a revolution in six minutes and divided into two separate sections 74 and 75 so that the material is ball burnished in tank 76 for about twelve minutes. It is then passed on to the washing and screening drum 77 where the burnishing balls are separated out by the screen 78 and carried by pockets 79 to the return chute 72. The washing and screening drum is connected to the ball burnishing drum 73 as a unit driven by gear 80 and rotating in cradles 81.

The material discharged from the washing and screening drum 77 passes through the conveyor passage 82 to the dryer drum 83 supported at one end by the flange 84 running in the rollers of cradle 85 and having the other end supported by the rim 86 of a spider the shaft 87 of which is journalled in the vertically adjustable bearing 88 and driven by sprocket 89 at any desired rate. The adjustable inclination of the axis provided by the adjusting of bearing 88 enables the rate of feed of the material through the drying drum to be varied to time the drying operation according to the character of the articles dried. The drying drum is enclosed in a casing 90 heated by burners 91 and the cleaned, plated, burnished and dried material is finally fed out in finished form through the chute 92.

In the modification shown in Figs. 4 and 5 the material is not ball burnished. It is fed into supply drum 100 separately rotated in cradles 101, 102, by bevel gear drive 103 arranged to give the desired rate of rotation. The inclination of the axis of the drum may be adjusted by cradle 101 to vary the rate of feeding according to the nature of the material. At each rotation of drum 100 a charge of material is picked up by scoop 105 and passed to transfer cylinder 106 which feeds it to the cleaning drum 107 rotated in cradles 108 by gear drive 109. Cleaning drum 107 is rotated four times per minute and is provided with an internal helical flange or conveyor 110 having a pitch which gives eleven complete convolutions throughout the length of the drum so that the material is in the drum 107 approximately three minutes subjected to the cleaning alkali solution in tank 111. It is then picked up by scoop 112 and passed on through transfer chamber 113 to water wash drum 114 in tank 115. Drum 114 is connected to drum 107 as a unit driven by the gear 109 and the drum 114 is of such length as to have the material fed through in about one and one half minutes and it is then picked up by scoop 116 and passed onto transfer chamber 117. From this chamber the material passes into the acid dip drum 118 rotated by gear 119 in cradles 120 and of such length as to have the material fed through in about two minutes so that the material is exposed to the acid dip solution in tank 121 for about this length of time before it is picked up by scoop 122 and passed on to transfer chamber 123 feeding it to the water wash drum 124 in tank 125. The wash drum 124 is connected to the acid dip drum 118 as a unit and is supported by cradle 126, the drum 124 being of such length that the material is fed through it in about one and one half minutes.

The material thus cleaned and washed is fed from drum 124 through transfer chamber 127 and conveyed to the chute 128 leading to the plating apparatus. This conveying means may be of any type best suited to the particular conditions of each installation. In the specific example shown in the drawings the conveying means comprises a belt conveyor 129 receiving the material from transfer passage 127 and carrying it upward and dropping it into the chute 128. The charge of material sliding down this chute falls into the oscillating trough or cradle 130 swinging on shaft 131 in bearings 132 and 133, one of which 133 is vertically adjustable to vary the inclination of the cradle and aid in controlling the rate of feed of material therethrough. The cradle 130 has the ends 134 and sides 135 to prevent escape of material and hanging from the shaft 131 are the anodes 136 and cathodes 137. The anode 136 is suspended in electroplating liquid in tank 138 above the material passing through the cradle and the cathode 137 is provided by the bars 140 extending between the T-shaped holders 141 loosely journalled on the shaft 131 so that the cathode will follow any shifting movement of the material. Instead of the relatively movable cathode means 140 cathode strips of the form shown in Fig. 3 for drum 55 may be provided. The material undergoes this plating operation during repeated oscillations of the cradle 130, for instance, for fifteen minutes at the end of which time it has reached the lower end of the cradle 130 and is received alternately in the pockets 143, 144 when in lowermost position and carried up by the oscillation of the cradle and deposited in the chute 145. The buckets 143 and 144 and the right-hand end portion of the chute 145 overlap or are in intersecting vertical planes as shown in Fig. 4a, and as the cradle nears the ends of its oscillating movement the buckets will alternately be brought to a position overlying the chute so that the material will drop down into it. From this chute the material slides into feed chamber 146 of the water wash drum 147 in tank 148 wherein it is washed for about one and one half minutes and passed on through transfer chamber 149 to the drying drum 150 supported by cradle 151 and the adjustable bearing 152 and driven by a gear on shaft 153 in bearing 152 so that the inclination of the dryer may be varied to control the rate of feed of the articles through it.

While the invention has been explained in connection with illustrative apparatus and specific sequences and times of treatment have been mentioned by way of example the principle of the invention is not confined thereto but is intended to cover such modifications as fall within the scope of the appended claims.

I claim:

1. An apparatus for treating the material in a liquid, the combination with a tank for the liquid, of an oscillating cradle for supporting and stirring the material in said liquid, and means for moving said cradle to feed the material out of it.

2. An apparatus for treating the material in a liquid, the combination of a tank for the liquid, of a cradle oscillating about an axis in a plane parallel to the direction of progress of the material and adapted to support and stir the material in said liquid, and means for moving said cradle to feed the material out of it.

3. In electroplating apparatus the combination with a tank for the electrolyte, of an oscillating cradle for supporting and stirring the material in said electrolyte, cathode members carried in said cradle, and means for oscillating said cradle to feed material from one end to the other thereof.

4. In electroplating apparatus the combination with a tank for the electrolyte, of an oscillating cradle for supporting and stirring the material in said electrolyte, cathode members carried in said cradle, means for oscillating said cradle to feed material from one end to the other thereof, and means for discharging material from said cradle comprising pick-up pockets adapted to discharge the material.

5. In apparatus for plating articles the combination with a series of tanks containing cleaning and washing liquids, of means in each tank for moving the articles therethrough as a mass, the lengths of said means in said tanks being different to correspond to the time of treatment in the respective tanks, an automatic feed for the articles to said means comprising an adjustment to vary the rate of feed of the articles, means for subsequently plating the articles and means for varying the duration of the plating treatment according to the character of the articles being plated, all of such apparatus being automatic in operation so that the articles are cleaned and plated without intermediate handling.

6. In apparatus for plating articles the combination with a series of tanks containing cleaning and washing liquids, of means in each tank for moving the articles therethrough as a mass, the lengths of said means in said tanks being different to correspond to the time of treatment in the respective tanks, an automatic feed for articles to said means comprising an adjustment to vary the rate of feed of the articles, means for subsequently plating the articles and means for finally cleaning and drying said articles, said last named means being adjustable to vary the rate of travel of the articles therein, all of said apparatus being automatic in operation so that the articles are cleaned and plated and dried without intermediate handling.

7. In apparatus for plating articles the combination with a series of tanks containing cleaning and washing liquids, of means in each tank for moving the articles therethrough as a mass, the lengths of said means in said tanks being different to correspond with the time of treatment in the respective tanks, means for varying the rate of feed of the articles to said series of tanks, means for subsequently plating the articles, means for delivering said articles in distinct batches and means for receiving and treating said articles in said batches comprising a tank containing a liquid and having a rotatable drum element adapted to submerge each batch of material in said liquid, means for introducing burnishing balls into said material in said drum element and stirring said balls and material together for desired length of time, means for screening the balls outward away from said material and automatically returning the screened balls to said introducing means, and means for separately moving said material inward to automatically feed it out of said drum element.

8. In apparatus for plating articles the combination with a series of tanks containing cleaning and washing liquids, of means in each tank for moving the articles therethrough as a mass, the lengths of said means in said tanks being different to correspond with the time of treatment in the respective tanks, means for varying the rate of feed of the articles to said series of tanks, means for subsequently plating the articles, means for delivering said articles in distinct batches and means for receiving and treating said articles in said batches comprising a tank containing a liquid and having a rotatable drum element adapted to submerge each batch of material in said liquid, means for mixing with said material burnishing balls of smaller size than the individual elements of said material so that said material and said burnishing balls will be stirred together in said drum element for a desired length of time, means for delivering said mixed material and burnishing balls from said stirring operation, subsequent means for automatically screening the balls outward away from said material and means for separately feeding and delivering said material after separation from said balls.

9. In electroplating apparatus the combination with a tank for the electrolyte, of an oscillating cradle having an open top and an inclined trough portion for supporting and stirring the material in said electrolyte as it progresses downwardly along said inclined trough, cathode members supported in contact with the material in said cradle, means for oscillating said cradle to stir the material in alternately opposite directions while in contact with said cathode members, means for feeding material into the upper end of said trough and out of the lower end thereof and anode members supported in said electrolyte adjacent said cradle.

KURT T. POTTHOFF.